UNITED STATES PATENT OFFICE.

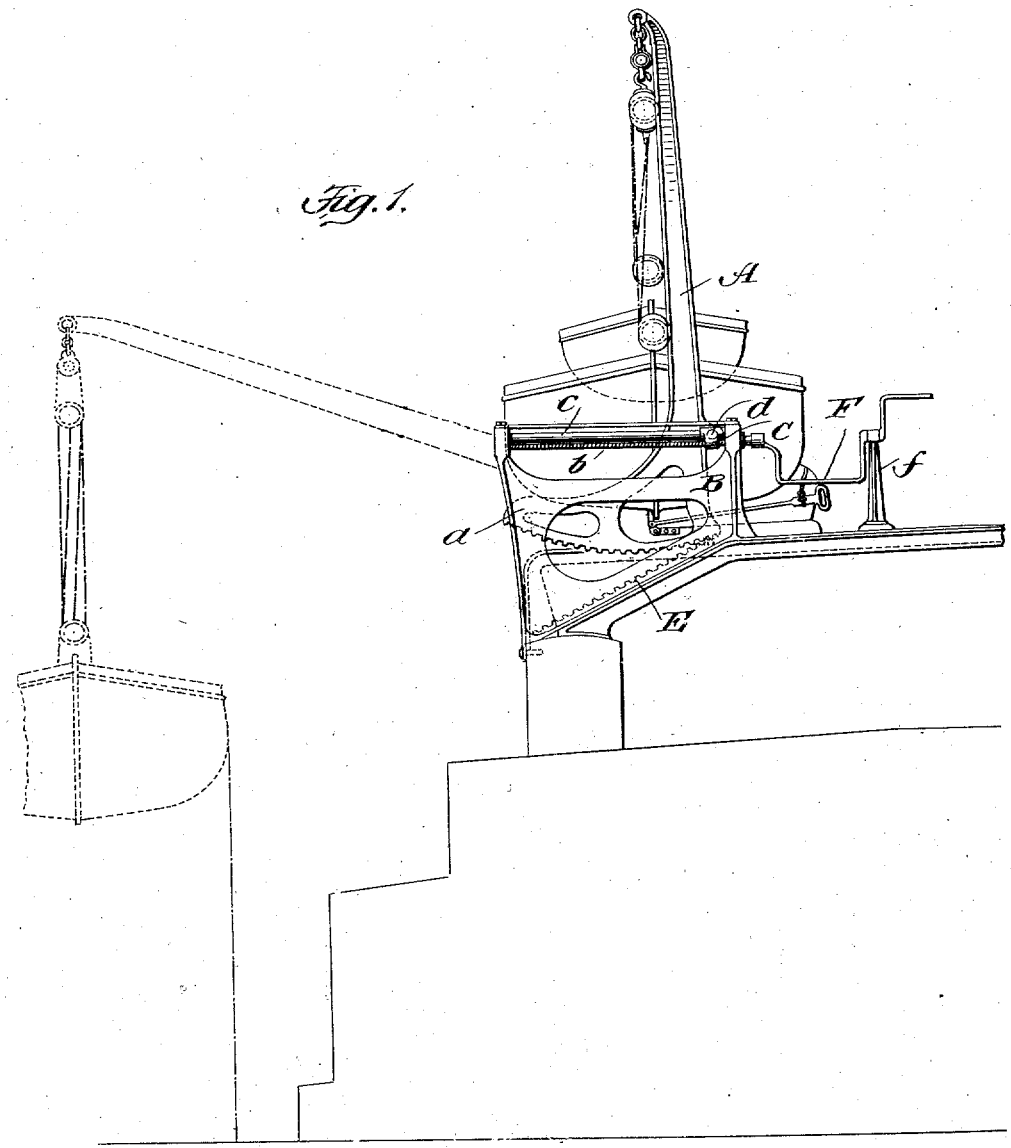

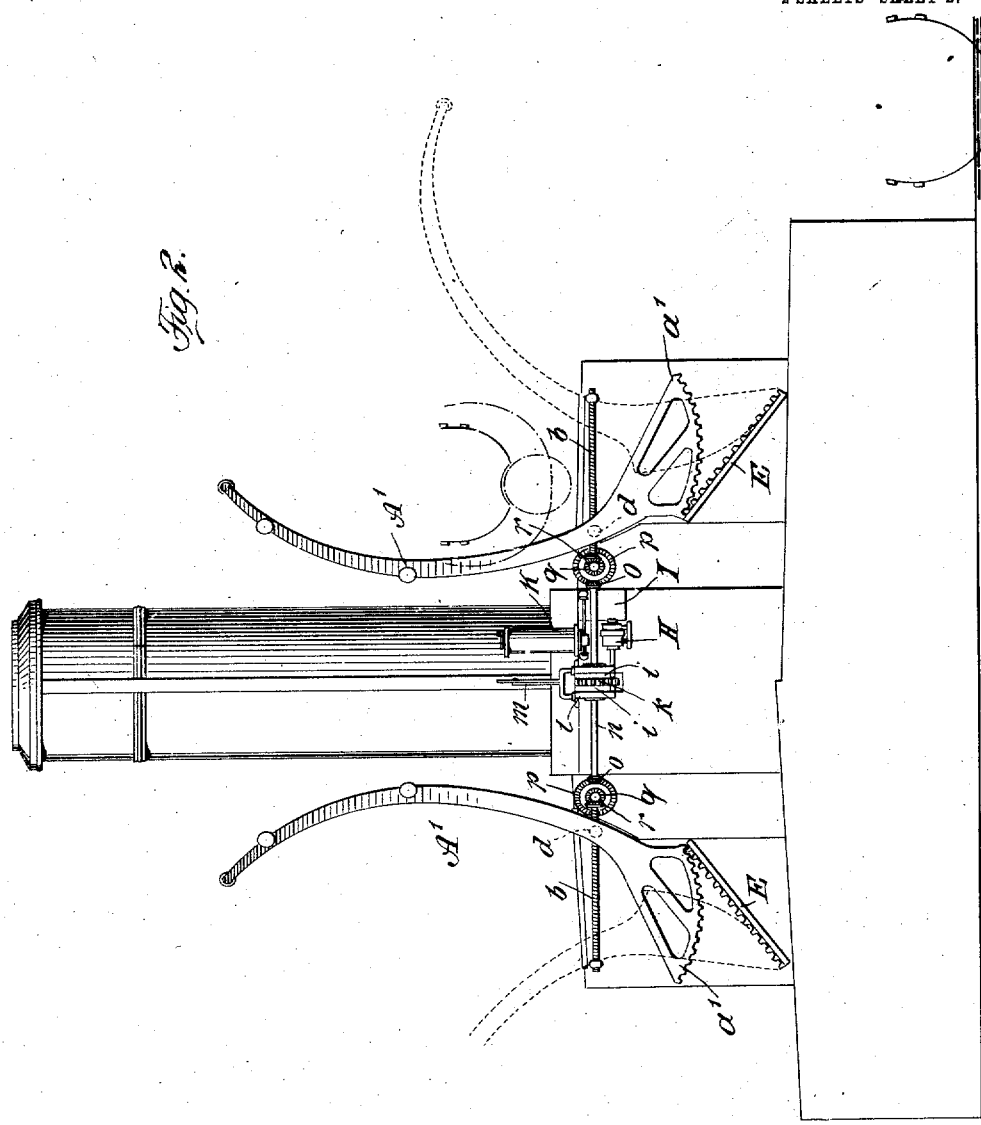

AXEL WELIN, OF LONDON, ENGLAND, ASSIGNOR TO WELIN QUADRANT DAVIT, A CORPORATION OF NEW YORK.

DAVIT FOR HOISTING AND LOWERING BOATS.

938,448.         Specification of Letters Patent.         Patented Oct. 26, 1909.

Application filed December 2, 1907. Serial No. 404,809.

*To all whom it may concern:*

Be it known that I, AXEL WELIN, a subject of the King of Sweden, and a resident of London, England, have invented certain new and useful Improvements in Davits for Hoisting and Lowering Boats, of which the following is a specification.

This invention relates to davits for hoisting and lowering boats, particularly adapted for use on battleships and other war vessels. In this class of vessels the boats are frequently carried on lofty superstructures situated some distance inboard and much difficulty has been encountered in causing the requisite outreach of the davit to carry the boat clear of the side of the vessel in order to lower it, and this is particularly true when the heavy weight of the boats usually carried by vessels of this class is considered. Increasing the length of the davit arm cannot be continued indefinitely without subjecting it to dangerous strains.

My present invention is designed to overcome these difficulties.

In the accompanying drawings I have illustrated preferred embodiments of my invention, one where manual power is employed for handling comparatively light boats and the other where an electric or other power motor is employed for handling launches and other heavy boats.

In these drawings: Figure 1 is an elevation showing a manually operated mechanism embodying my invention. Fig. 2 is a similar view showing mechanism embodying my invention adapted to be operated by an electric or other power motor.

Referring to Fig. 1, A indicates a davit arm having at its lower end a toothed segment or sector $a$. B is a frame rigidly secured to the vessel, and $b$ is a worm supported in the frame to have rotary, but not longitudinal movement. The worm extends through a threaded nut C which is slidably supported on a rod $c$ also mounted in the frame, and the davit arm is pivoted to the nut as indicated by $d$. As shown the pivotal connection is at what I shall term the rear side of the davit arm and it will be observed that with the pivot $d$ as a center the radii of the toothed segment gradually increase from its rear end to its front end.

E is a rack rigidly supported upon the vessel and with the teeth of which the teeth on the segment $a$ may engage. As shown, the rack inclines downward from its rear to its front end, and when the davit arm is in its normal position which, in Fig. 1, is substantially vertical, the segment is engaged at its shortest radii with the rear end of the rack. By rotating the worm the nut will be caused to travel from the position shown in Fig. 1 to the other end of the worm and this will result in moving the arm through an arc of substantially 80° as indicated by the dotted lines. As the radius of the segment increases toward its front end it will always keep in proper engagement with the inclined rack and the arm will be moved positively and without undue strain on any part of the mechanism. By thus increasing the arc of movement of the davit arm the boat can be swung outboard to a sufficient extent to clear the side of the vessel without increasing the length of the davit arm to a dangerous extent. Furthermore, there will be no especial difficulty in bringing the boat inboard as the greatest leverage will be available when most desired. It is also obvious that the teeth will prevent any slipping movement between the segment and the inclined support on which it rolls.

Any means may be employed to rotate the worm, and as shown, I employ a crank shaft F connected to the inner end of the worm and supported in a standard $f$.

In Fig. 2 the same principle is involved but the illustration is somewhat diagrammatical. Here two curved davit arms A' A' are shown and $d$ indicates the pivotal connection to the nuts which will travel on the worms $b$. Each davit arm is provided at its lower end with a toothed segment or sector $a'$ which has increasing radii from its rear to its front end with relation to the pivot $d$, and coöperates with an inclined rack E. In this case the worms are designed to be operated by an electric or other power motor. As shown, H indicates an electric motor, I a rheostat, K a controller and $k$ a gear which is driven by the motor shaft, and which gear is connected to clutch members $i$, one on each side thereof, and which are adapted to coöperate respectively with clutch members $l$ $l$, and a lever $m$ serves to control the engagement or release of the several clutch members. To each of the clutch members $l$ a shaft $n$ is secured which carries a bevel pinion $o$ which engages a bevel gear $p$. This gear $p$ carries a smaller bevel gear $q$ concentric therewith which engages with a similar gear $r$ on the ends of the respective worms $b$. Evidently when the motor shaft is rotated and the clutch lever $m$ is operated either of the worms $b$ may be rotated by the motor shaft at reduced speed and with increased power.

Wherever I have used the word "segment" or "sector" I have used it not in the sense of a curve relating more particularly to a portion of a circle, but really in the broader sense of any suitable curved portion.

Without limiting myself to the precise details of construction illustrated and described, I claim:

1. The combination of a davit arm, a movable pivot on which the arm may turn, a segment on the lower end of the arm increasing in radii with respect to the pivot from its rear to its front end, an inclined support on which the segment may roll, means for preventing any slipping between the segment and inclined support, and means for moving the pivot.

2. The combination of a davit arm, a
30 movable pivot on which the arm may turn, a toothed segment on the lower end of the arm increasing in radius with respect to the pivot from its rear to its front end, a rack inclined downwardly from its rear to its front end and on which the segment may roll, and means for moving the pivot.

3. The combination of a davit arm, a worm supported to have rotary but not longitudinal movement, a nut movable on said worm and to which the davit arm is pivoted, a toothed segment on the lower end of the arm which increases in radius with respect to the pivot from its rear to its front end, a rack inclining downwardly from its rear to its front end and on which the said segment may roll, and means for rotating the worm.

4. The combination of a davit arm, a worm supported to have rotary but not longitudinal movement, a nut movable on said worm and to which the davit arm is pivoted, a toothed segment on the lower end of the arm which increases in radius with respect to the pivot from its rear to its front end, a rack inclining downwardly from its rear to its front end and on which the said segment may roll, a motor, and gearing interposed between the motor and the worm for rotating the worm at decreased speed but increased power.

In witness whereof, I have signed my name to the foregoing specification in the presence of two subscribing witnesses.

AXEL WELIN.

Witnesses:
GEORGE H. SCHRODER,
JOS. F. O'BRIEN.

---

Correction in Letters Patent No. 938,448.

It is hereby certified that Letters Patent No. 938,448, granted October 26 1909, upon the application of Axel Welin, of London, England, for an improvement in "Davits for Hoisting and Lowering Boats," were erroneously issued to "Welin Quadrant Davit, a corporation of New York," as owner of said invention; whereas said Letters Patent should have been issued to *Welin Davit and Lane & De Groot Co., Consolidated, a corporation of New York*, as assignee of the entire interest in said patent, as shown by the record of assignments in this office; and that the said Letters Patent should be read with this correction therein that the same may conform to the record of the case in the Patent Office.

Signed and sealed this 30th day of November, A. D., 1909.

[SEAL.]

E. B. MOORE,
*Commissioner of Patents.* a shaft $n$ is secured which carries a bevel pinion $o$ which engages a bevel gear $p$. This gear $p$ carries a smaller bevel gear $q$ concentric therewith which engages with a similar gear $r$ on the ends of the respective worms $b$. Evidently when the motor shaft is rotated and the clutch lever $m$ is operated either of the worms $b$ may be rotated by the motor shaft at reduced speed and with increased power.

Wherever I have used the word "segment" or "sector" I have used it not in the sense of a curve relating more particularly to a portion of a circle, but really in the broader sense of any suitable curved portion.

Without limiting myself to the precise details of construction illustrated and described, I claim:

1. The combination of a davit arm, a movable pivot on which the arm may turn, a segment on the lower end of the arm increasing in radii with respect to the pivot from its rear to its front end, an inclined support on which the segment may roll, means for preventing any slipping between the segment and inclined support, and means for moving the pivot.

2. The combination of a davit arm, a movable pivot on which the arm may turn, a toothed segment on the lower end of the arm increasing in radius with respect to the pivot from its rear to its front end, a rack inclined downwardly from its rear to its front end and on which the segment may roll, and means for moving the pivot.

3. The combination of a davit arm, a worm supported to have rotary but not longitudinal movement, a nut movable on said worm and to which the davit arm is pivoted, a toothed segment on the lower end of the arm which increases in radius with respect to the pivot from its rear to its front end, a rack inclining downwardly from its rear to its front end and on which the said segment may roll, and means for rotating the worm.

4. The combination of a davit arm, a worm supported to have rotary but not longitudinal movement, a nut movable on said worm and to which the davit arm is pivoted, a toothed segment on the lower end of the arm which increases in radius with respect to the pivot from its rear to its front end, a rack inclining downwardly from its rear to its front end and on which the said segment may roll, a motor, and gearing interposed between the motor and the worm for rotating the worm at decreased speed but increased power.

In witness whereof, I have signed my name to the foregoing specification in the presence of two subscribing witnesses.

AXEL WELIN.

Witnesses:
GEORGE H. SCHRODER,
JOS. F. O'BRIEN.

---

It is hereby certified that Letters Patent No. 938,448, granted October 26 1909, upon the application of Axel Welin, of London, England, for an improvement in "Davits for Hoisting and Lowering Boats," were erroneously issued to "Welin Quadrant Davit, a corporation of New York," as owner of said invention; whereas said Letters Patent should have been issued to *Welin Davit and Lane & De Groot Co., Consolidated, a corporation of New York*, as assignee of the entire interest in said patent, as shown by the record of assignments in this office; and that the said Letters Patent should be read with this correction therein that the same may conform to the record of the case in the Patent Office.

Signed and sealed this 30th day of November, A. D., 1909.

[SEAL.]

E. B. MOORE,
*Commissioner of Patents.*

Correction in Letters Patent No. 938,448.

It is hereby certified that Letters Patent No. 938,448, granted October 26 1909, upon the application of Axel Welin, of London, England, for an improvement in "Davits for Hoisting and Lowering Boats," were erroneously issued to "Welin Quadrant Davit, a corporation of New York," as owner of said invention; whereas said Letters Patent should have been issued to *Welin Davit and Lane & De Groot Co., Consolidated, a corporation of New York*, as assignee of the entire interest in said patent, as shown by the record of assignments in this office; and that the said Letters Patent should be read with this correction therein that the same may conform to the record of the case in the Patent Office.

Signed and sealed this 30th day of November, A. D., 1909.

[SEAL.]

E. B. MOORE,
*Commissioner of Patents.*